(12) United States Patent
Tsai et al.

(10) Patent No.: US 11,148,336 B2
(45) Date of Patent: Oct. 19, 2021

(54) SENSING MODULE

(71) Applicant: Industrial Technology Research Institute, Hsinchu (TW)

(72) Inventors: Meng-Chiao Tsai, Taoyuan (TW); Feng-Chia Hsu, Kaohsiung (TW); Chung-Yuan Su, Tainan (TW); Peng-Jen Chen, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 260 days.

(21) Appl. No.: 16/286,612

(22) Filed: Feb. 27, 2019

(65) Prior Publication Data

US 2020/0206999 A1    Jul. 2, 2020

(30) Foreign Application Priority Data

Dec. 26, 2018   (TW) .................................. 107147183

(51) Int. Cl.
  *B29C 45/78* (2006.01)
  *B29C 45/26* (2006.01)
  *G01L 19/00* (2006.01)

(52) U.S. Cl.
  CPC .............. *B29C 45/78* (2013.01); *B29C 45/26* (2013.01); *G01L 19/0092* (2013.01);
  (Continued)

(58) Field of Classification Search
  CPC ......... B29C 45/78; B29C 45/26; B29C 45/77; B29C 2945/76254; B29C 2945/76006; B29C 2945/7604; B29C 2945/76287; B29C 2945/76461; G01L 9/0001; G01L 19/0092; G01J 5/0037; G01J 2005/068
  See application file for complete search history.

(56) References Cited

U.S. PATENT DOCUMENTS 4,625,559 A * 12/1986 Carter ..................... G01L 9/006
                                                    73/706
4,722,612 A    2/1988 Junkert et al.
(Continued)

FOREIGN PATENT DOCUMENTS

| CN | 103481478 | 1/2014 |
| CN | 104626469 | 5/2015 |

(Continued)

OTHER PUBLICATIONS

"Office Action of Taiwan Counterpart Application," dated Aug. 5, 2019, p. 1-p. 6.
(Continued)

*Primary Examiner* — Galen H Hauth
(74) *Attorney, Agent, or Firm* — JCIPRNET

(57) ABSTRACT

A sensing module includes a hollow body, a first photo sensor, and a second photo sensor. The hollow body includes a cavity portion and an insertion portion connected to each other. The insertion portion has a first channel and a second channel. The first photo sensor is disposed in the cavity portion of the hollow body and corresponds to the first channel to sense an ambient temperature and a test object temperature. The second photo sensor is disposed in the cavity portion of the hollow body and corresponds to the second channel to sense the ambient temperature.

25 Claims, 6 Drawing Sheets

(52) U.S. Cl.
CPC .............. *B29C 2945/7604* (2013.01); *B29C 2945/76006* (2013.01); *B29C 2945/76254* (2013.01)

(56) References Cited

U.S. PATENT DOCUMENTS

| | | | |
|---|---|---|---|
| 7,476,095 | B2 | 1/2009 | Bader et al. |
| 8,082,796 | B1 | 12/2011 | Doelle |
| 8,425,217 | B2 | 4/2013 | Groleau |
| 8,753,553 | B2 | 6/2014 | Kazmer et al. |
| 8,920,150 | B2 | 12/2014 | Tanaka et al. |
| 9,003,897 | B2 | 4/2015 | Wade et al. |
| 9,476,777 | B2 | 10/2016 | Yonekura |
| 2007/0258506 | A1 | 11/2007 | Schwagerman et al. |
| 2008/0019415 | A1 | 1/2008 | Kraus |
| 2008/0192798 | A1 | 8/2008 | Weng et al. |
| 2013/0030723 | A1* | 1/2013 | Gao .............. G01N 33/442 702/50 |
| 2013/0182745 | A1 | 7/2013 | Hertel et al. |
| 2015/0192478 | A1 | 7/2015 | Rueth et al. |
| 2016/0123816 | A1* | 5/2016 | Pei ............... G01J 5/06 374/121 |
| 2017/0199064 | A1 | 7/2017 | Lozano |
| 2018/0125599 | A1 | 5/2018 | Merza et al. |

FOREIGN PATENT DOCUMENTS

| | | |
|---|---|---|
| CN | 103398784 | 6/2015 |
| CN | 102980714 | 5/2016 |
| CN | 105806492 | 7/2016 |
| CN | 105890830 | 8/2016 |
| CN | 106584800 | 4/2017 |
| DE | 102016215609 | 10/2017 |
| EP | 1873506 | 1/2008 |
| EP | 1967833 | 9/2008 |
| EP | 1873506 | 4/2010 |
| EP | 2450682 | 5/2012 |
| EP | 2002254 | 5/2014 |
| TW | 476694 | 2/2002 |
| TW | 555965 | 10/2003 |

OTHER PUBLICATIONS

"Office Action of China Counterpart Application", dated Jun. 11, 2021, p. 1-p. 13.

* cited by examiner

SENSING MODULE

CROSS-REFERENCE TO RELATED APPLICATION

This application claims the priority benefit of Taiwan application serial no. 107147183, filed on Dec. 26, 2018. The entirety of the above-mentioned patent application is hereby incorporated by reference herein and made a part of this specification.

TECHNICAL FIELD

The disclosure relates to a sensing module, and relates to a sensing module which senses temperature with a photo sensor. At the same time, the sensing module may also combine the photo sensor and a pressure sensor.

BACKGROUND

Most of the injection molding products today are becoming more refined and miniaturized. However, it is difficult to dispose a plurality of monitoring points in injection molding of the refined and miniaturized products. Also, the monitoring points may easily leave traces on the products, which increases subsequent processing procedures of finished products. Furthermore, temperature sensor currently used in injection molding mold may be easily affected by ambient temperatures such as mold temperature, causing it to be difficult to accurately know the temperature of the injection material in the mold. In addition, if the temperature and the pressure of the injection material in the injection molded mold are to be simultaneously measured, the temperature sensor and a pressure sensor have to be separately inserted. Therefore, it is difficult to know the condition of the injection material on the same monitoring point.

SUMMARY

The sensing module of the disclosure includes a hollow body, a first photo sensor, and a second photo sensor. The hollow body includes a cavity portion and an insertion portion connected to each other. The insertion portion has a first channel and a second channel. The first photo sensor is disposed in the cavity portion of the hollow body and corresponds to the first channel to sense an ambient temperature and a test object temperature. The second photo sensor is disposed in the cavity portion of the hollow body and corresponds to the second channel to sense the ambient temperature.

The sensing module of the disclosure includes a hollow body, at least one photo sensor, and a pressure sensor. The hollow body is adapted to abut a board and includes a cavity portion and an insertion portion connected to each other. The photo sensor is disposed in the cavity portion of the hollow body and corresponds to the insertion portion to sense at least one test object temperature of at least one test object. The pressure sensor is disposed in the cavity portion of the hollow body and is located between the board and the photo sensor to sense the pressure exerted by the test object to the hollow body.

The sensing module of the disclosure is adapted to sense a test object temperature and a test object pressure injected into a mold. The sensing module includes a hollow body, a first photo sensor, a second photo sensor, and a pressure sensor. The hollow body includes a cavity portion and an insertion portion connected to each other. The cavity portion is located outside the mold and is adapted to abut a board, and the insertion portion is inserted into the mold and has a first channel and a second channel. The first photo sensor is disposed in the cavity portion of the hollow body and corresponds to the first channel to receive a mold radiant heat and a test object radiant heat, so as to sense a first temperature. The second photo sensor is disposed in the cavity portion of the hollow body and corresponds to the second channel to receive the mold radiant heat, so as to sense a second temperature. The test object temperature equals to the first temperature minus the second temperature. The pressure sensor is disposed in the cavity portion of the hollow body and is located between the board and the first photo sensor and the second photo sensor to receive the pressure exerted by the test object to the hollow body, so as to sense the test object pressure.

To make the aforementioned and other features of the disclosure more comprehensible, several embodiments accompanied with drawings are described in detail as follows.

DETAILED DESCRIPTION OF DISCLOSED EMBODIMENTS

The disclosure provides a sensing module, which adopts two photo sensors to measure a test object temperature, has a temperature compensation mechanism, and may improve signal stability and accuracy.

The disclosure also provides a sensing module, which can simultaneously measure temperature and pressure, and may improve quality control capability.

The disclosure further provides a sensing module, which obtains a test object temperature not interfered by a mold radiant heat through a differential measurement method and can simultaneously measure a test object pressure through a pressure sensor. In this way, it is possible to combine the respective number of the temperature sensing module and the pressure sensing module used in the mold, and to reduce traces of the sensing modules left on the product.

Figure 1A:
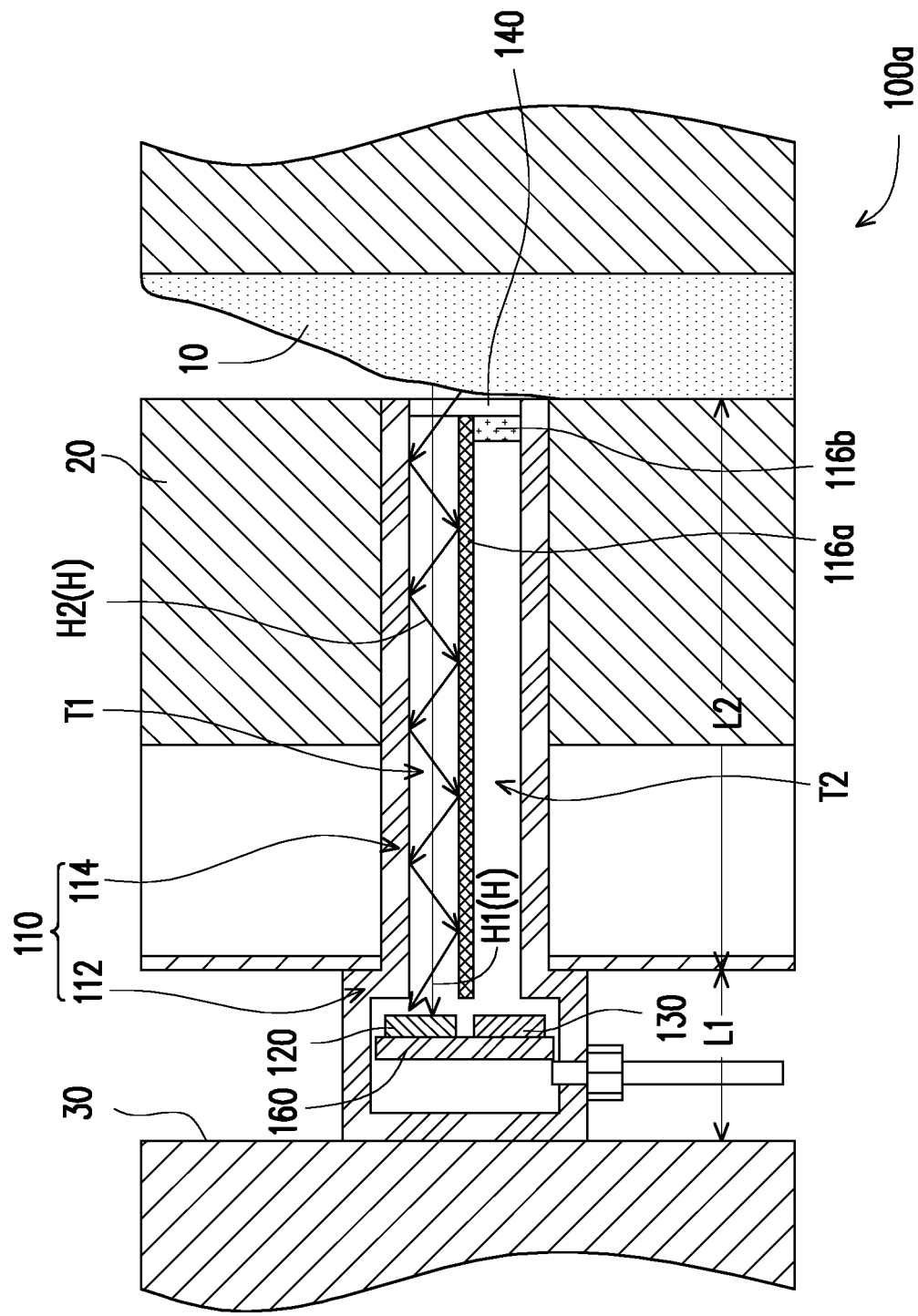
FIG. 1A is a schematic diagram of a sensing module according to an embodiment of the disclosure.

FIG. 1A is a schematic diagram of a sensing module according to an embodiment of the disclosure. Referring to FIG. 1A first, in the embodiment, a sensing module 100a includes a hollow body 110 and at least one photo sensor (FIG. 1A schematically shows a first photo sensor 120 and a second photo sensor 130, and the first photo sensor 120 and the second photo sensor 130 are provided on a circuit board 160). The hollow body 110 includes a cavity portion 112 and an insertion portion 114 connected to each other. The insertion portion 114 has a first channel T1 and a second channel T2. The first photo sensor 120 is disposed in the cavity portion 112 of the hollow body 110 and corresponds to the first channel T1 to sense an ambient temperature and a test object temperature. The second photo sensor 130 is disposed in the cavity portion 112 of the hollow body 110 and corresponds to the second channel T2 to sense the ambient temperature.

In detail, the cavity portion 112 of the hollow body 110 of the embodiment is adapted to abut a board 30 and a first length L1 of the cavity portion 112 of the hollow body 110 is smaller than a second length L2 of the insertion portion 114. In other words, the second length L2 of the insertion portion 114 of the hollow body 110 is greater than the first length L1 of the cavity portion 112. The shape of the hollow body 110 is, for example, a plug shape or a T shape, but is not limited thereto. The insertion portion 114 of the hollow body 110 is filled with an air or is in a vacuum state and the insertion portion 114 of the hollow body 110 is adapted to be inserted into, for example, a mold 20. Here, the material of the hollow body 110 is, for example, a metal material, but is not limited thereto.

Furthermore, the hollow body 110 of the embodiment further includes a first partition 116a disposed in the insertion portion 114 to divide the insertion portion 114 into the first channel T1 and the second channel T2. As shown in FIG. 1A, the first partition 116a is approximately parallel or parallel to the extension direction of the insertion portion 114. In the embodiment, the hollow body 110 may further include a second partition 116b shielding a side of the second channel T2 and opposing the second photo sensor 130. In an embodiment, an inner surface area of the first channel T1 and an inner surface area of the second channel T2 are the same. The "identical" as indicated herein refers to generally the same or about the same.

In order to prevent the test object 10 from entering the sensing module 100a, the sensing module 100a of the embodiment further includes an optical element, such as a lens 140, covering the insertion portion 114 of the hollow body 110 and shielding a side of the first channel T1 and the second channel T2 relatively far away from the first photo sensor 120 and the second photo sensor 130. As shown in FIG. 1A, the lens 140 is located between the insertion portion 114 and the test object 10, and the lens 140 is adapted to allow an invisible light (such as an infrared light) radiated by the test object 10 to penetrate. In other words, an infrared radiation of the test object 10 can penetrate the lens 140 to be transmitted to the first sensor 120.

Referring to FIG. 1A again, the first photo sensor 120 of the embodiment receives an ambient radiant heat and a test object radiant heat, so as to sense an ambient temperature and a test object temperature. The second photo sensor 130 receives the ambient radiant heat, so as to sense the ambient temperature. Here, the ambient radiant heat is, for example, the mold radiant heat of the mold 20, and the ambient temperature is, for example, the mold temperature of the mold 20. Also, the test object 10 may be, for example, a molten plastic or a cured plastic. Furthermore, the test object 10 is adapted to emit a test object radiant heat H, and a first portion H1 of the test object radiant heat H directly irradiates to the first photo sensor 120 and a second portion H2 of the test object radiant heat H is reflected to the first photo sensor 120 via an inner wall of the insertion portion 114 and the first partition 116a. In other words, the test object radiant heat H of the test sensor 10 has at least two transmission paths to the first sensor 120. Since the second partition 116b of the hollow body 110 isolates the second channel T2 from the test object radiant heat H, the second sensor 130 will not sense the test object radiant heat H. In short, the configuration of the second partition 116b is to prevent the test object radiant heat H from entering the second channel T2.

Figure 1B:
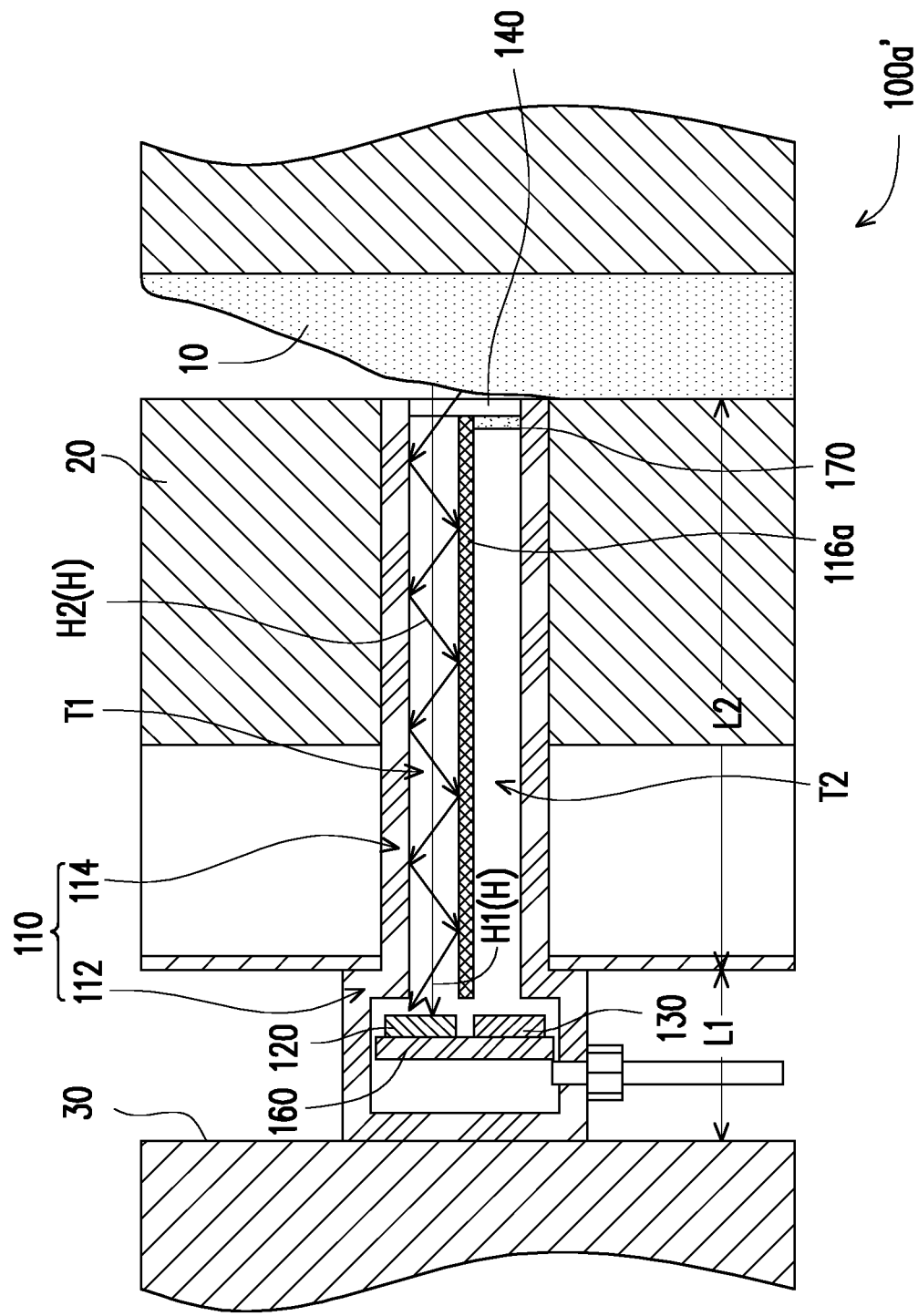
FIG. 1B is a schematic diagram of a sensing module according to another embodiment of the disclosure.

The embodiment of the disclosure is not limited to the method of using a partition to prevent the test object radiant heat H from entering the second channel T2. In another embodiment, referring to FIG. 1B, a sensing module 100a' of the embodiment further includes a lightproof coating 170 disposed on the optical element (i.e. the lens 140) to shield a side of the second channel T2 and to oppose the second photo sensor 130. The configuration of the lightproof coating 170 can isolate the second channel T2 from the test object radiant heat H.

The first photo sensor 120 of the embodiment corresponds to the first channel T1 to sense the ambient temperature and the test object temperature, and the second photo sensor 130 corresponds to the second channel T2 to sense the ambient temperature. Therefore, if the temperature sensed by the first sensor 120 is subtracted from the temperature sensed by the second sensor 130, the test object temperature can be obtained. In other words, the sensing module 100a of the embodiment can obtain the test object temperature not interfered by the ambient temperature by making use of the differential measurement method (i.e. the temperature sensed by the second sensor 130 minus the temperature sensed by the first sensor 120). In short, the sensing module 100a of the embodiment may improve signal stability and accuracy through a temperature compensation mechanism. In addition, since the surface area of the first channel T1 and the surface area of the second channel T2 of the embodiment are the same, the first sensor 120 and the second sensor 130 can measure the most radiant heat, allowing the ambient temperature and the test object temperature sensed thereby to be accurate.

The following embodiments continue to use the reference numerals and parts of the aforementioned embodiments, wherein the same reference numerals are adopted to represent the same or similar elements and the illustration of the same technical content is omitted. For the illustration of the omitted parts, the aforementioned embodiments may be taken as reference and will not be reiterated in the following embodiments.

Figure 2A:
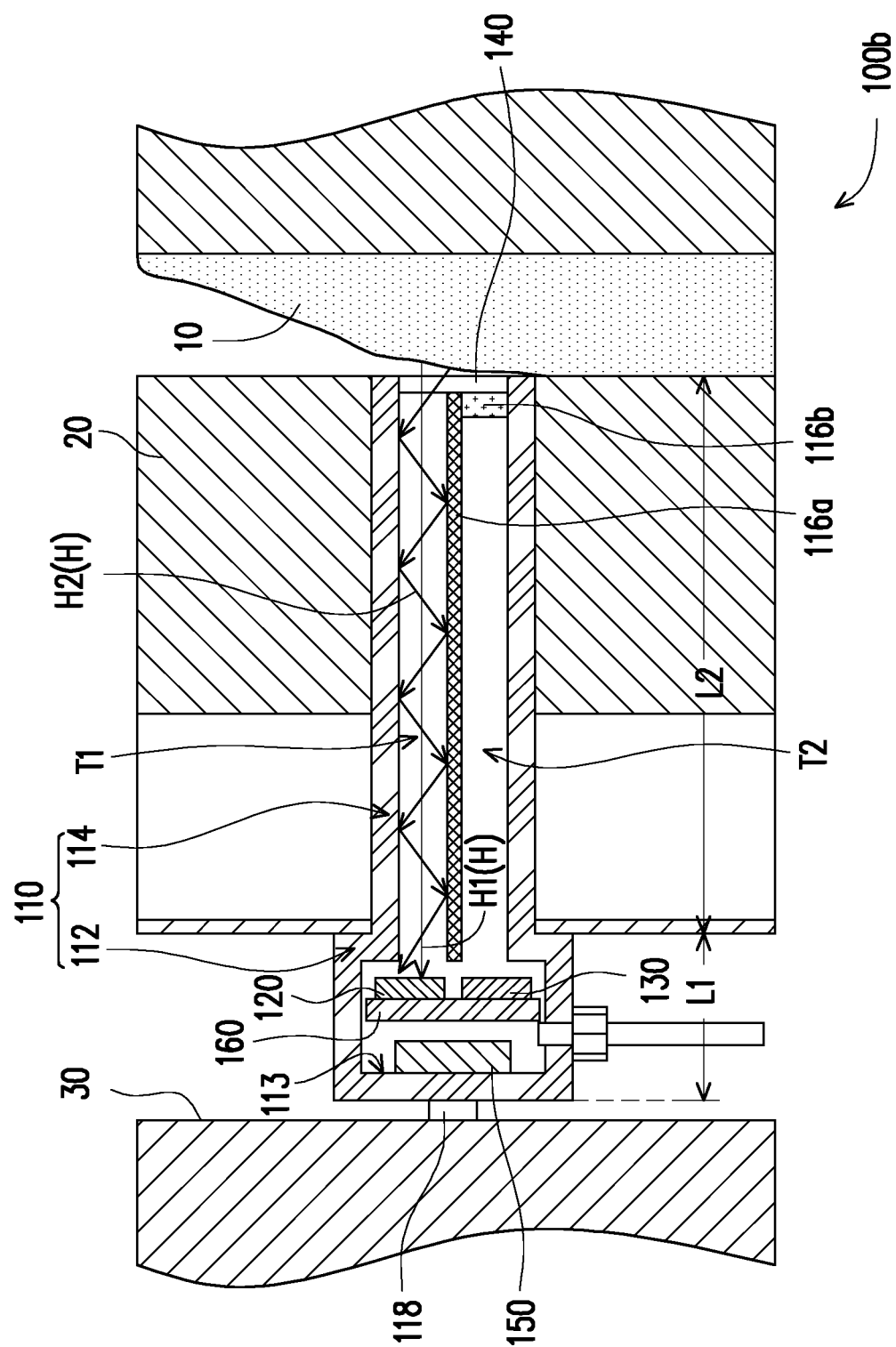
FIG. 2A is a schematic diagram of a sensing module according to another embodiment of the disclosure.
Figure 2B:
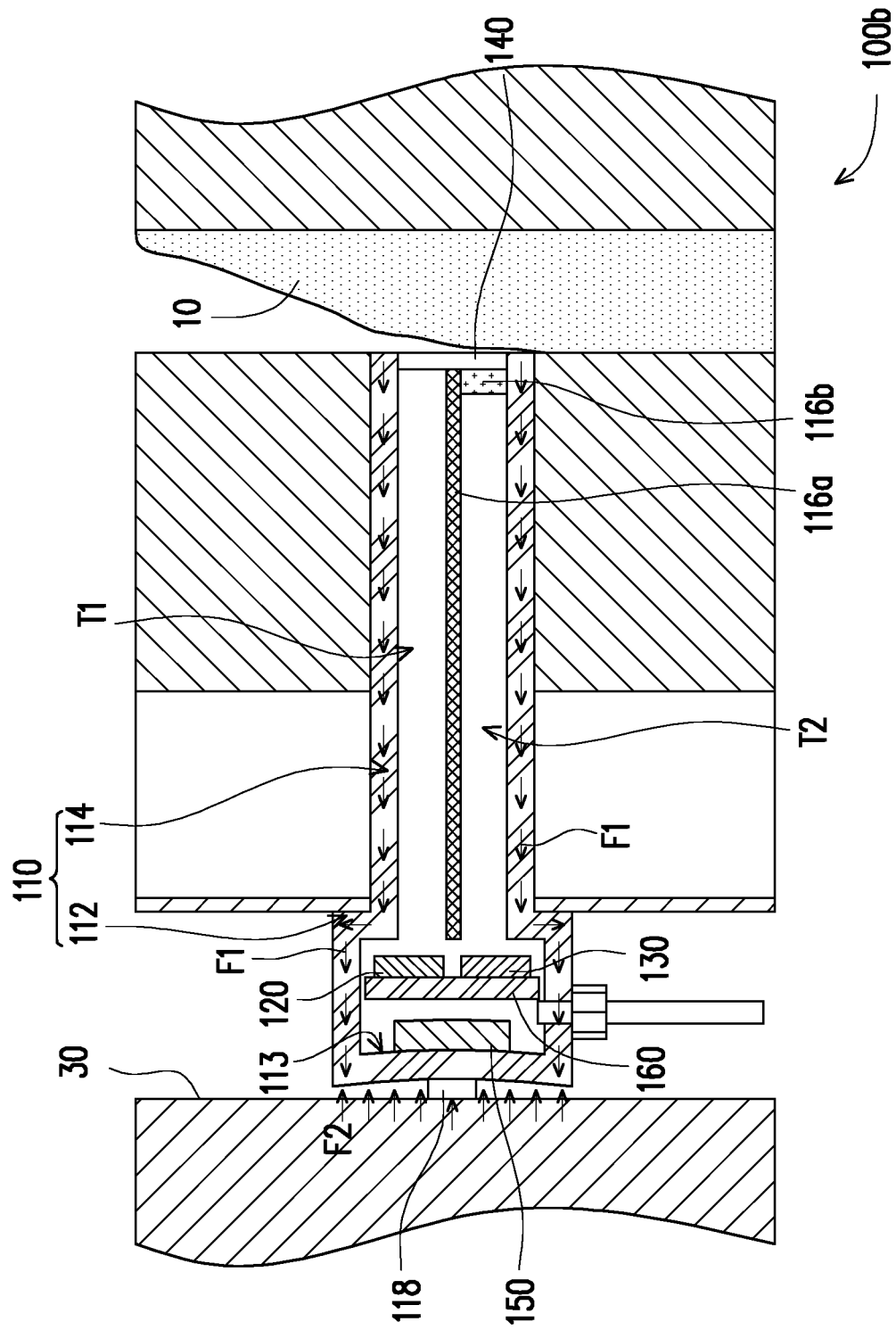
FIG. 2B is a schematic diagram of a pressure sensor of the sensing module of FIG. 2A sensing a pressure exerted by a test object to a hollow body.

FIG. 2A is a schematic diagram of a sensing module according to another embodiment of the disclosure. FIG. 2B is a schematic diagram of a pressure sensor of the sensing module of FIG. 2A sensing a pressure exerted by a test object to a hollow body. Referring to FIG. 2A and FIG. 1A, a sensing module 100b of the present embodiment is similar to the sensing module 100a of FIG. 1A. The difference between the two is that the sensing module 100b of the present embodiment further includes a pressure sensor 150 disposed in the cavity portion 112 of the hollow body 110 and abuts an abutment surface 113 in the cavity portion 112 to sense the pressure exerted by the test object 10 to the hollow body 110. As shown in FIG. 2A, the first photo sensor 120 and the second photo sensor 130 are located between the lens 140 and the pressure sensor 150.

Furthermore, the hollow body 110 of the embodiment further includes a protruding point 118, wherein the protruding point 118 abuts the board 30 and is located on the abutment surface 113 of the cavity portion 112. As shown in FIG. 2A, the abutment surface 113 of the embodiment is located between the protruding point 118 and the pressure sensor 150. Referring to FIG. 2B, when the test object 10 exerts a pressure F1 to the hollow body 110, the pressure sensor 150 senses a reaction force F2 of the protruding point 118 and becomes deformed. Here, the pressure F1 is, for example, a fluid pressure (such as a hydraulic pressure) of the test object 10, and the pressure sensor 150 is, for example, a strain gauge or a piezoelectric element.

In short, the sensing module 100b of the embodiment is embodied as a composite sensing module. The sensing module 100b senses the test object temperature and the ambient temperature through the first sensor 120 and the second sensor 130, and obtains the test object temperature not interfered by the mold radiant heat through the differential measurement method using the test object temperature and the ambient temperature. At the same time and at the same place, the sensing module 100b measures the test object pressure through the pressure sensor 150. Therefore, the sensing module 100b of the embodiment can simultaneously sense the test object temperature and the test object pressure of the test object 10 at the same place, which may improve quality control capability of the test object 10.

Figure 3A:
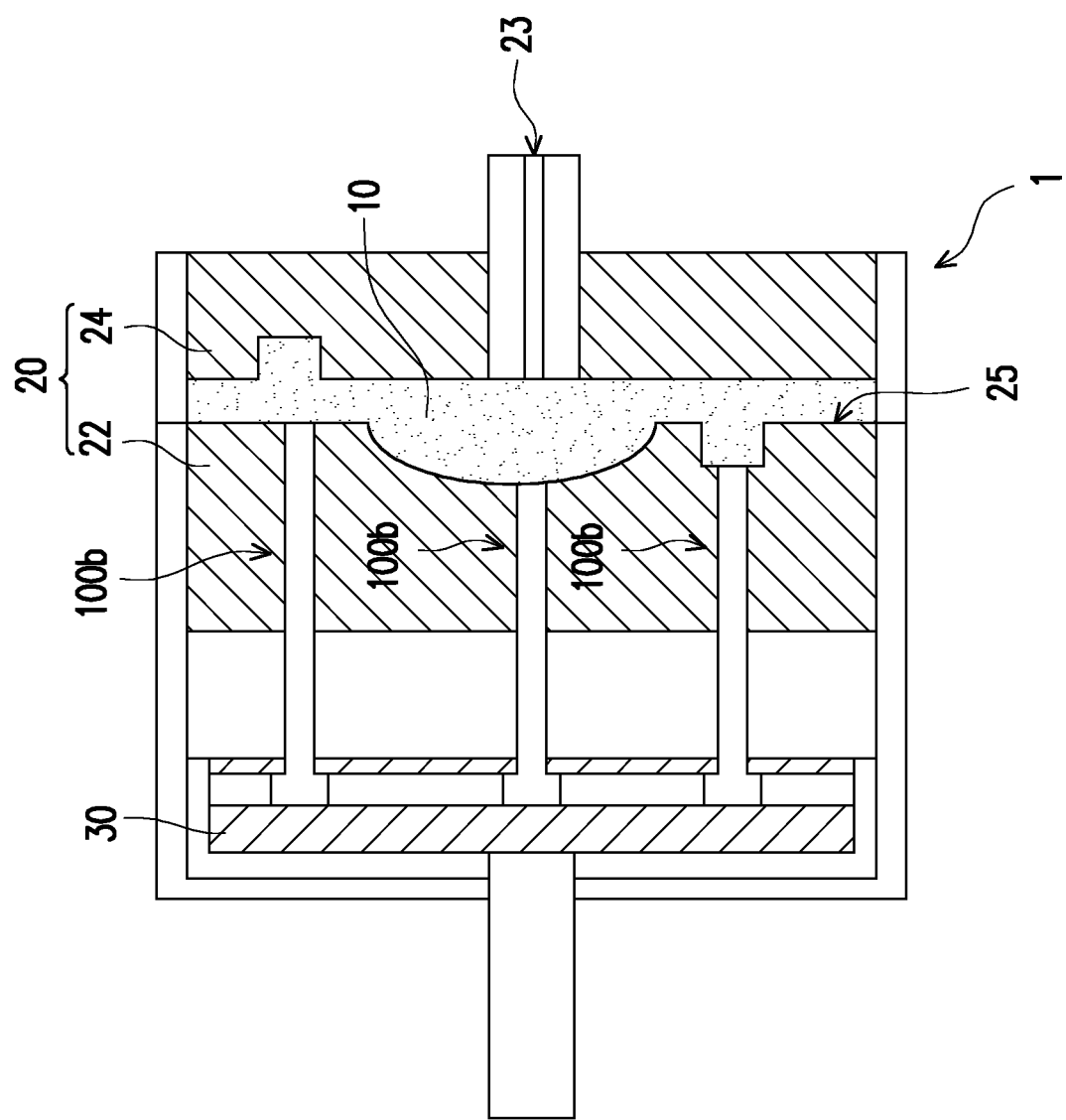
FIG. 3A is a schematic diagram of the sensing module of FIG. 2A disposed in an injection molding apparatus.
Figure 3B:
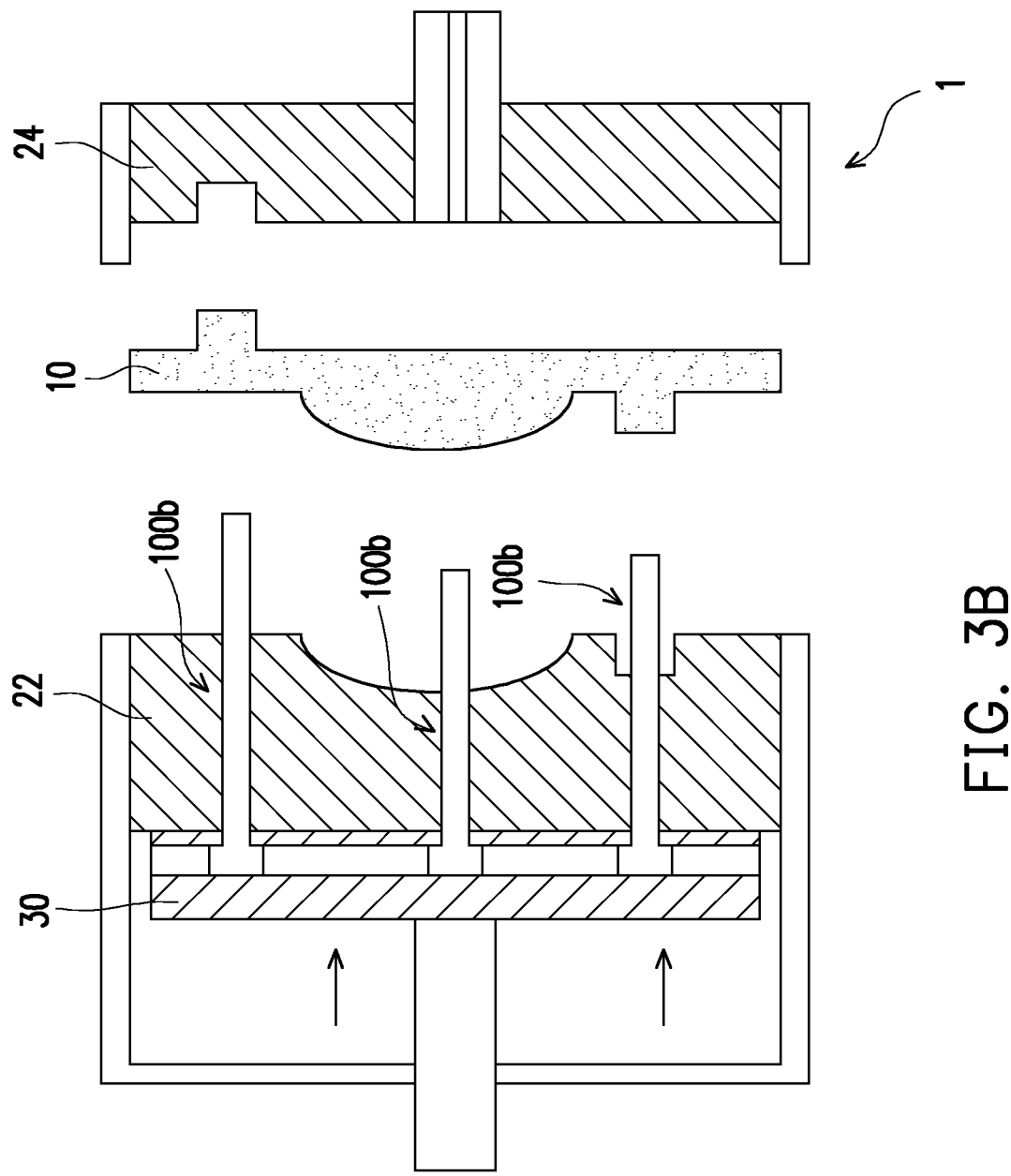
FIG. 3B is a schematic diagram of a first mold and a second mold of a mold of FIG. 3A when separated.

FIG. 3A is a schematic diagram of the sensing module of FIG. 2A disposed in an injection molding apparatus. FIG. 3B is a schematic diagram of a first mold and a second mold of a mold of FIG. 3A when separated. Referring to FIG. 2A and FIG. 3A at the same time, in the embodiment, a plurality of the sensing modules 100b of FIG. 2A are provided in the mold 20 of an injection molding apparatus 1 to sense the test object temperature and test object pressure of the test object 10 (i.e. a plastic) in the mold 20.

In detail, the mold 20 includes a first mold 22 and a second mold 24, wherein the first mold 22 and the second mold 24 define a mold cavity 25 after assembly, and the test object 10 (i.e. the plastic) can enter the mold cavity 25 from an injection inlet 23. After the test object 10 enters the mold cavity 25, the first photo sensor 120 of the sensing module 100b is disposed in the cavity portion 112 of the hollow body 110 and corresponds to the first channel T1 to be able to receive the mold radiant heat and the test object radiant heat, so as to sense a first temperature. The second photo sensor 130 is disposed in the cavity portion 112 of the hollow body 110 and corresponds to the second channel T2 to be able to receive the mold radiant heat, so as to sense a second temperature. At this time, the test object temperature equals to the first temperature minus the second temperature. The pressure sensor 150 is disposed in the cavity portion 112 of the hollow body 110 and is located between the board 30 and the first photo sensor 120 and the second photo sensor 130 to be able to receive the pressure exerted by the test object to the hollow body 110, so as to sense the test object pressure. Referring to FIG. 3B, after the test object 10 is cured and formed, the first mold 22 and the second mold 24 may be disassembled, so as to remove the test object 10 from the mold 20.

The sensing module 100b of the embodiment obtains the test object temperature not interfered by the mold radiant heat through the differential measurement method and the test object pressure at the same place can be simultaneously measured through the pressure sensor 150. Therefore, the number of the sensing module 100b used in the injection molding apparatus 1 can be reduced and traces of the sensing module 100b left on the test object 10 can also be reduced. In short, the embodiment simultaneously senses the test object temperature and the test object pressure of the test object 10 at the same place through a single composite sensing module 100b, which can effectively reduce the number of the sensing module 100b used and may also reduce the chance of damage of the test object 10.

Based on the above, in the design of the sensing module according to an embodiment of the disclosure, the first photo sensor corresponds to the first channel to sense an ambient temperature and a test object temperature. The second photo sensor corresponds to the second channel to sense the ambient temperature. By making use of the differential measurement method (i.e. the temperature sensed by the second sensor minus the temperature sensed by the first sensor), the test object temperature not interfered by the ambient temperature can be obtained. In short, the sensing module according to the embodiment of the disclosure may improve signal stability and accuracy through the temperature compensation mechanism.

In addition, in the design of the sensing module according to another embodiment of the disclosure, other than sensing the test object temperature and the ambient temperature through the first sensor and the second sensor, and obtaining the test object temperature not interfered by the mold radiant heat through the differential measurement method using the test object temperature and the ambient temperature, the sensing module can also simultaneously sense the test object pressure at the same place through the pressure sensor. In other words, the sensing module according to another embodiment of the disclosure is substantially a single composite sensing module, which may improve quality control capability, effectively reduce the number of the sensing module used, and also reduce the chance of damage of the test object.

It may be apparent to those skilled in the art that various modifications and variations may be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A sensing module, comprising:
a hollow body comprising a cavity portion and an insertion portion connected to each other, wherein the insertion portion has a first channel and a second channel;
a first photo sensor disposed in the cavity portion of the hollow body and corresponding to the first channel to sense an ambient temperature and a test object temperature;
a second photo sensor disposed in the cavity portion of the hollow body and corresponding to the second channel to sense the ambient temperature; and
a pressure sensor disposed in the cavity portion of the hollow body and abutting on an abutment surface of the cavity portion to sense a pressure exerted by the test object to the hollow body,
wherein the hollow body further comprises a protruding point adapted to abut a board and located on the abutment surface of the cavity portion, the abutment surface is located between the protruding point and the pressure sensor, when the test object exerts a pressure to the hollow body, the pressure sensor senses a reaction force of the protruding point and becomes deformed.

2. The sensing module according to claim 1, wherein the hollow body further comprises a first partition disposed in the insertion portion to divide the insertion portion into the first channel and the second channel.

3. The sensing module according to claim 2, wherein the first partition is parallel to an extension direction of the insertion portion.

4. The sensing module according to claim 3, wherein the test object is adapted to emit a test object radiant heat, a first portion of the test object radiant heat directly irradiates to the first photo sensor and a second portion of the test object radiant heat is reflected to the first photo sensor via the insertion portion and the first partition.

5. The sensing module according to claim 2, wherein the hollow body further comprises a second partition shielding a side of the second channel and opposing the second photo sensor.

6. The sensing module according to claim 1, wherein the first photo sensor and the second photo sensor respectively receives an ambient radiant heat of an external environment, so as to sense the ambient temperature.

7. The sensing module according to claim 1, further comprising:
a lens covering the insertion portion of the hollow body and shielding a side of the first channel and the second channel relatively far away from the first photo sensor and the second photo sensor, wherein the lens is located between the insertion portion and a test object, and the lens is adapted to allow an infrared light radiated by the test object to penetrate.

8. The sensing module according to claim 1, wherein the first photo sensor and the second photo sensor are located between the lens and the pressure sensor.

9. The sensing module of claim 1, wherein the pressure sensor comprises a strain gauge or a piezoelectric element.

10. The sensing module according to claim 7, further comprising:
a lightproof coating disposed on the lens to shield a side of the second channel and to oppose the second photo sensor.

11. The sensing module according to claim 1, wherein a first length of the cavity portion of the hollow body is smaller than a second length of the insertion portion.

12. The sensing module according to claim 1, wherein the insertion portion of the hollow body is filled with air or is in a vacuum state.

13. The sensing module according to claim 1, wherein an inner surface area of the first channel and an inner surface area of the second channel are the same.

14. A sensing module, comprising:
a hollow body adapted to abut a board and comprising a cavity portion and an insertion portion connected to each other;
at least one photo sensor disposed in the cavity portion of the hollow body and corresponding to the insertion portion to sense at least one test object temperature of at least one test object; and
a pressure sensor disposed in the cavity portion of the hollow body and located between the board and the photo sensor to sense a pressure exerted by the test object to the hollow body,
wherein the hollow body further comprises a protruding point adapted to abut the board and located on an abutment surface of the cavity portion, the abutment surface is located between the protruding point and the pressure sensor, when the test object exerts a pressure to the hollow body, the pressure sensor senses a reaction force of the protruding point and becomes deformed.

15. The sensing module according to claim 14, wherein the insertion portion comprises a first channel and a second channel, the at least one photo sensor comprises a first photo sensor and a second photo sensor, the first photo sensor receives an ambient radiant heat and a test object radiant heat, so as to sense an ambient temperature and the test object temperature, and the second photo sensor receives the ambient radiant heat, so as to sense the ambient temperature.

16. The sensing module according to claim 15, wherein an inner surface area of the first channel and an inner surface area of the second channel are the same.

17. The sensing module according to claim 15, wherein the hollow body further comprises a first partition disposed in the insertion portion to divide the insertion portion into the first channel and the second channel parallel to each other.

18. The sensing module according to claim 17, wherein a first portion of the test object radiant heat is directly irradiated to the first photo sensor and a second portion of the test object radiant heat is reflected to the first photo sensor via the insertion portion and the first partition.

19. The sensing module according to claim 17, wherein the hollow body further comprises a second partition isolating the second channel from the test object radiant heat.

20. The sensing module according to claim 14, further comprising:
an optical element covering the insertion portion of the hollow body and shielding a side of the insertion portion relatively far away from the photo sensor, wherein the optical element is located between the insertion portion and the test object, and the optical element is adapted to allow an invisible light of the test object to penetrate.

21. The sensing module according to claim 20, further comprising:
a lightproof coating disposed on the optical element to isolate a second channel the test object radiant heat.

22. The sensing module according to claim 14, wherein the pressure sensor comprises a strain gauge or a piezoelectric element.

23. The sensing module according to claim 14, wherein a first length of the cavity portion of the hollow body is smaller than a second length of the insertion portion.

24. The sensing module according to claim 14, wherein the insertion portion of the hollow body is filled with air or is in a vacuum state.

25. A sensing module, adapted to sense a test object temperature and a test object pressure injected into a mold, the sensing module comprising:
a hollow body comprising a cavity portion and an insertion portion connected to each other, wherein the cavity portion is located outside the mold and is adapted to abut a board, and the insertion portion is inserted into the mold and has a first channel and a second channel;
a first photo sensor disposed in the cavity portion of the hollow body and corresponding to the first channel to receive a mold radiant heat and a test object radiant heat, so as to sense a first temperature;
a second photo sensor disposed in the cavity portion of the hollow body and corresponding to the second channel to receive the mold radiant heat, so as to sense a second temperature, wherein the test object temperature equals to the first temperature minus the second temperature; and
a pressure sensor disposed in the cavity portion of the hollow body and located between the board and the first photo sensor and the second photo sensor to receive a pressure exerted by the test object to the hollow body, so as to sense the test object pressure,
wherein the hollow body further comprises a protruding point adapted to abut the board and located on an abutment surface of the cavity portion, the abutment surface is located between the protruding point and the pressure sensor, when the test object exerts a pressure to the hollow body, the pressure sensor senses a reaction force of the protruding point and becomes deformed.

\* \* \* \* \*